United States Patent [19]

Khan et al.

[11] Patent Number: 5,527,951

[45] Date of Patent: Jun. 18, 1996

[54] POLYMERIZATION CATALYST AND PROCESS

[75] Inventors: Jamil A. Khan, Waterbury; Walter Nudenberg, Newtown; David J. Smudin, Waterbury; Demetreos N. Matthews, Bethany, all of Conn.

[73] Assignee: Uniroyal Chemical Company, Inc., Middlebury, Conn.

[21] Appl. No.: 372,689

[22] Filed: Jan. 12, 1995

Related U.S. Application Data

[63] Continuation of Ser. No. 185,733, Jan. 24, 1994, abandoned, which is a continuation of Ser. No. 902,454, Jun. 19, 1992, abandoned, which is a continuation of Ser. No. 684,447, Apr. 11, 1991, abandoned, which is a continuation of Ser. No. 229,186, Aug. 5, 1988, abandoned, which is a continuation of Ser. No. 750,842, Jul. 1, 1985, abandoned, which is a continuation-in-part of Ser. No. 528,202, Aug. 31, 1983, abandoned, which is a continuation-in-part of Ser. No. 449,368, Dec. 14, 1982, abandoned, and Ser. No. 449,811, Dec. 14, 1982, abandoned.

[51] Int. Cl.$^6$ .................................................. C07C 69/62
[52] U.S. Cl. ..................... 560/219; 560/226; 562/598; 562/602
[58] Field of Search ................................ 560/219, 226; 562/598, 602

[56] References Cited

U.S. PATENT DOCUMENTS

| | | | |
|---|---|---|---|
| 3,462,399 | 8/1969 | Matthews | 260/80.78 |
| 3,600,368 | 4/1968 | Schaum et al. | |
| 3,622,548 | 11/1971 | Emde et al. | 260/80.78 |
| 4,189,558 | 2/1980 | Witte et al. | 526/169.2 |
| 4,347,159 | 8/1982 | Nudenberg et al. | 252/429 |
| 4,378,455 | 3/1983 | Kawasaki et al. | 526/114 |
| 4,378,456 | 3/1983 | Wieder et al. | 526/169.2 |
| 4,384,090 | 5/1983 | Hocker et al. | 526/169.2 |

FOREIGN PATENT DOCUMENTS 0004957  10/1979  European Pat. Off. .

OTHER PUBLICATIONS

CA95(11):98321g 1981.
CA96(5):34492j 1981.
CA94(19):156258s 1980.
CA92(15):128428n 1979.
CA92(17):146226z 1979.
CA82(15):97637s 1974.
CA90(9):71710a 1978.
CA91(25):210918k 1979.
CA71(11):49319r 1969.
CA71(4):13992r 1968.
CA91(25):210918k 1979.

*Primary Examiner*—Paul J. Killos
*Attorney, Agent, or Firm*—Daniel Reitenbach

[57] ABSTRACT

Tert-alkylmethoxy-substituted vanadium compounds, several of which are novel, are useful as catalysts for the polymerization of ethylene or the copolymerization of ethylene with alphaolefins and (optionally) nonconjugated polyenes. Also disclosed is a novel catalyst composition comprising such vanadium compounds.

11 Claims, No Drawings

POLYMERIZATION CATALYST AND PROCESS

This is a continuation of application Ser. No. 08/185,733, filed on Jan. 24, 1994, now abandoned which was a continuation of Ser. No. 07/902,454 filed Jun. 19, 1992, now abandoned which was a continuation of application Ser. No. 07/684,447 filed Apr. 11, 1991, now abandoned which was a continuation of application Ser. No. 07/229,186 filed Aug. 5, 1988, now abandoned which was a continuation of application Ser. No. 06/750,186 filed Jul. 1, 1985, now abandoned which was a continuation-in-part of application Ser. No. 06/528,202 filed Aug. 31, 1983, now abandoned which was a continuation-in-part of application Ser. No. 05/449,368 and application Ser. No. 05/449,811 both filed Dec. 14, 1982, all now abandoned.

FIELD OF THE INVENTION

This invention relates to a process for the polymerization of ethylene or the copolymerization of ethylene with at least one copolymerizable alphaolefin and (optionally) at least one nonconjugated polyene which process comprises reacting such monomer or monomers in the presence of a polymerization catalyst composition comprising a tert-alkylmethoxy-substituted vanadium compound. In another aspect, this invention relates to the novel vanadium compounds employed in such catalyst composition. In yet another aspect this invention is directed to novel catalyst compositions comprising such vanadium compounds and certain organoaluminum compounds.

BACKGROUND OF THE INVENTION

The use of certain vanadium compounds as catalysts for the polymerization of ethylene or the copolymerization of ethylene with alphaolefins and (optionally) nonconjugated polyenes has long been known in the polymerization art. Thus, for example, Natta et al in U.S. Pat. No. 3,260,708 disclose the use of a broad scope of vanadium compounds including vanadium halides; vanadium oxyhalides; vanadyl di- and triacetylacetonates and haloacetyloacetonates; vanadium tribenzoylacetonate; vanadyl trialcoholates and haloalcoholates; the tetrahydrofuranates, the etherates, the aminates of vanadium tri- and tetrachloride and of vanadyl trichloride; and the pyridates of vanadium tri- and tetrachloride and of vanadyl trichloride; as catalysts in the copolymerization of ethylene and aliphatic alphaolefins with certain nonconjugated polyenes. Butcher et al in British Patent 1,403,372 disclose a similarly broad list of vanadium compounds for ethylene polymerization and for ethylene/alpha-monoolefin copolymerization. It is noteworthy that Butcher et al indicate (at page 1, lines 73–74) that "vanadium oxytrichloride is particularly effective" for ethylene copolymerization and ethylene/alpha-monoolefin while Bond, Jr. et al in U.S. Pat. No. 4,022,961 indicate (at col. 5, lines 31–38) that vanadium oxytrichloride is "particularly preferred" as a catalyst for ethylene/alphaolefin/nonconjugated polyene (i.e., "EPDM") polymerization.

While vanadium compound catalysts such as vanadium oxytrichloride (VOCl$_3$) will, when employed in conjunction with organoaluminum cocatalysts, effectively catalyze the polymerization or copolymerization of ethylene and alphaolefins and/or nonconjugated polyenes, their relatively low efficiency (i.e., the weight of polymer produced per gram of vanadium changed) generally requires a catalyst removal step. This is because a high residual vanadium content in these types of polymers may lead to degradation of such polymers. The removal of vanadium residue from polyolefin polymers is a time-consuming and expensive process. It would therefore be desirable to possess more efficient vanadium catalysts which would produce polymers having a low enough vanadium content that catalyst removal treatment would not be necessary.

U.S. Pat. Nos. 4,189,558 to Witte et al and 4,378,455 to Kawasaki et al both disclose the use of compounds of the formula:

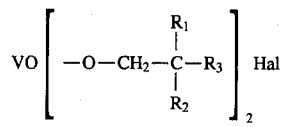

wherein R$_1$ each independently represents hydrogen or C$_1$–C$_4$ alkyl, R$_2$ each independently represents C$_1$–C$_4$ alkyl, R$_3$ each independently represents C$_1$–C$_8$ alkyl, and Hal represents chlorine or bromine; in conjunction with trialkylaluminum cocatalysts for the production of strictly alternating copolymers of trans-1,4-butadiene (i.e., a conjugated diene) and propylene. Witte et al discloses that these compounds are produced by reacting vanadium oxyhalides with the corresponding branched alcohols. A similar disclosure is made by Wieder and Witte, Journal of Applied Polymer Science, Vol. 26, pp. 2503–2508 (1981).

However, it is well established that significant differences exist between the copolymerization of conjugated polyenes and that of nonconjugated polyenes. Thus, F. P. Baldwin and G. Ver Strate, "Polyolefin Elastomers Based on Ethylene and Propylene", Rubber and Chemical Technology, Vol. 45, pages 709, 719 (1972) state: "Probably all early workers . . . investigated the use of simple, acyclic conjugated dienes because of price and availability, but it did not take many experiments to decide that these materials were far from adequate for EPDM preparation, catalyst deactivation, . . . being encountered."

Therefore, it has quite unexpectedly been found that certain tert-alkylmethoxy-substituted vanadium compounds will, when employed with certain organoaluminum cocatalysts, function as polyolefin catalysts more efficiently than prior art preferred catalysts such as VOCl$_3$.

DESCRIPTION OF THE INVENTION

In one aspect, this invention is directed to processes for either (A) the polymerization of ethylene; (B) the copolymerization of ethylene with at least one copolymerizable alphaolefin of the formula CH$_2$=CHR$^3$ wherein R$^3$ is C$_1$–C$_{10}$ alkyl; or (C) the copolymerization of ethylene with at least one copolymerizable alphaolefin of the formula CH$_2$=CHR$^3$ wherein R$^3$ is C$_1$–C$_{10}$ alkyl, and at least one nonconjugated polyene; all of which processes comprise conducting such polymerization or copolymerization in the presence of an effective amount of a catalyst composition comprising:

(a) a compound of the formula:

wherein:

R is a tertiary alkyl radical having 4–18 carbon atoms;

X is chlorine, bromine or iodine;

n is 0 or 1;

if n is 0 then:
  p is 1, 2, 3 or 4,
  m is 0, 1, 2 or 3, and
  q is 0, 1, 2 or 3;
with the proviso that
  p+q+m=3 or 4;
if n is 1 then:
  p is 1, 2 or 3,
  m is 0, 1 or 2, and
  q is 0, 1 or 2;
with the proviso that
  p+q+m=1, 2 or 3;
  $R^1$ is $C_1$–$C_{18}$ alkyl;
with the proviso that if q is 2, $R^1$ can also be $C_2$–$C_8$ alkylene; and
  (b) a compound of the formula:

$$R_r^2 AlX_s^2$$

wherein:
  $R^2$ is $C_1$–$C_{12}$ alkyl or $C_7$–$C_9$ aralkyl;
  $X^2$ is halogen;
  r is 1, 1.5, 2 or 3; and
  s is 3-r.

In another aspect, this invention is directed to a catalyst composition for the polymerization of ethylene, or for the copolymerization of ethylene with at least one copolymerizable alphaolefin and (optionally) at least one nonconjugated polyene which composition comprises:
  (a) a compound of the formula:

$$(O)_n V(OCH_2 R)_p (OR^1)_q X_m$$

wherein:
  R is a tertiary alkyl radical having 4–18 carbon atoms;
  X is chlorine, bromine or iodine;
  n is 0 or 1;
if n is 0 then:
  p is 1, 2, 3 or 4,
  m is 0, 1, 2 or 3, and
  q is 0, 1, 2 or 3,
with the proviso that
  m+p+q=3 or 4;
if n is 1 then:
  p is 1, 2 or 3,
  m is 0, 1, or 2 and
  q is 0, 1 or 2,
with the proviso that
  m+p+q=1, 2 or 3;
  $R^1$ is $C_1$–$C_{18}$ alkyl;
with the proviso that if q is 2, $R^1$ can also be $C_2$–$C_8$ alkylene; and
  (b) a compound of the formula:

$$R_r^2 AlX_s^2$$

wherein:
  $R^2$ is $C_1$–$C_{12}$ alkyl or $C_7$–$C_9$ aralkyl;
  $X^2$ is halogen;
  r is 1, 1.5 or 2; and
  s is 3-r.

In yet another aspect, this invention is directed to novel vanadium compounds which are useful as ethylene polymerization or copolymerization catalysts, which compounds are of the formula:

$$(O)_n V(OCH_2 R)_p (OR^1)_q X_m$$

wherein:
  R is a tertiary alkyl radical having 4–18 carbon atoms;
  X is chlorine, bromine or iodine;
  n is 0 or 1;
if n is 0 then:
  p is 1, 2, 3 or 4,
  m is 0, 1, 2 or 3, and
  q is 0, 1, 2 or 3,
with the proviso that
  m+p+q=3 or 4;
if n is 1 then:
  p is 1, 2 or 3,
  m is 0, 1 or 2, and
  q is 0, 1 or 2,
with the proviso that
  m+p+q=1, 2 or 3;
  $R^1$ is $C_1$–$C_{18}$ alkyl;
with the further provisos that:
  if q is 2, $R^1$ can also be $C_2$–$C_8$ alkylene; and
  if n is 1, p is 2, q is 0 and m is 1 then X is iodine.

As is employed herein, unless otherwise noted, the term "process of this invention" refers equally to the processes disclosed herein for the homopolymerization of ethylene, for the copolymerization of ethylene and at least one alphaolefin, and for the copolymerization of ethylene with at least one alphaolefin and at least one copolymerizable nonconjugated polyene.

The process of this invention employs a catalyst composition comprised of (a) a specified vanadium compound catalyst and (b) an organoaluminum cocatalyst.

The vanadium compound catalysts which may be employed are those of the formula:

$$(O)_n V(OCH_2 R)_p (OR^1)_q X_m \qquad (I)$$

wherein:
  R is a tertiary alkyl radical having 4–18 carbon atoms;
  X is chlorine, bromine or iodine;
  n is 0 or 1;
if n is 0 then:
  p is 1, 2, 3 or 4,
  m is 0, 1, 2 or 3, and
  q is 0, 1, 2 or 3;
with the proviso that
  p+q+m=3 or 4;
if n is 1 then:
  p is 1, 2 or 3,
  m is 0, 1 or 2, and
  q is 0, 1 or 2;
with the proviso that
  p+q+m=1, 2 or 3;
  $R^1$ is $C_1$–$C_{18}$ alkyl;
with the proviso that if q is 2, $R^1$ can also be $C_2$–$C_8$ alkylene.

It is to be understood that when $R^1$ is $C_3$–$C_{18}$ alkyl, such radical may be straight chain or branched. These catalysts are novel compounds except when n is 1, p is 2, q is 0, n is 1 and X is chlorine or bromine.

Preferred catalysts in the practice of this invention are those of Formula (I) above wherein R is a tertiary alkyl comprising 4–12 carbon atoms; is $R^1$ is $C_1$–$C_{12}$ alkyl; X is chlorine or bromine; n=1; p=2 or m=0 or 1; q=0 or 1; and p+q+m=3. Particularly preferred compounds include tris-neopentyl vanadate and bis-neopentyl chlorovanadate.

The vanadium compounds of this invention may be prepared by reacting p moles of an alcohol of the formula $RCH_2OH$ and q moles of an alcohol of the formula $R^1OH$ with one mole of a compound of the formula $V(O)_nX_v$, wherein m, n, p, q, x, R and $R^1$ are as defined above and v is the sum of q, m and p with the provisos that if n is 0, v is 3 or 4, and if n is 1, v is 1, 2 or 3. In those embodiments wherein n is 0, the reaction occurs in the presence of an acid acceptor.

In a preferred embodiment, the compound $V(O)_nX_v$ is in solution where the solvent is an aliphatic or aromatic hydrocarbon. Of the aliphatic or aromatic hydrocarbons, toluene and n-heptane are particularly preferred.

The organoaluminum cocatalysts of the process of this invention are compounds of the formula:

$$R_r^2AlX_s^2$$

wherein:

$R^2$ is $C_1$–$C_{12}$ alkyl or $C_7$–$C_9$ aralkyl;

$X^2$ is halogen;

r is 1, 1.5, 2 or 3; and s=3-r.

When these organoluminum cocatalysts are employed with the vanadium compound catalysts of Formula (I) above, the catalyst compositions of this invention are novel compositions except when r=3.

Preferably, the organoaluminum compound employed in the process of the present invention is a trialkylaluminum or an alkylaluminum halide. Of the trialkylaluminums, triethylaluminum is particularly preferred. Of the halide compounds, the chlorides are most preferred. Among the alkylaluminum chlorides preferred for use in this invention are ethylaluminum sesquichloride, ethylaluminum dichloride, diethylaluminum chloride and diisobutylaluminum chloride. Of all the above mentioned organoaluminum compounds, ethylaluminum sesquichloride and diethylaluminum chloride are most preferred.

When copolymerizable alphaolefins are to be employed in the process of this invention such compounds are of the formula $CH_2=CHR^3$ wherein $R^3$ is an alkyl radical containing from one to ten carbon atoms. When $R^3$ contains more than 2 carbon atoms such radical may be straight chain or branched. Preferred mono-alphaolefins include propylene, 1-butene, 1-pentene, 1-hexene, 3-methyl-1-pentene, 1-heptene, 1-octene and 1-decene.

The polyenes which may be employed in the process of this invention are nonconjugated. Illustrative of such nonconjugated polyenes are aliphatic dienes such as the cis- and trans- isomers of 1,4-hexadiene, 1,5-hexadiene, 1,4-pentadiene, 2-methyl- 1,4-pentadiene, 3-methyl- 1,4-hexadiene, 4-methyl-1,4-hexadiene, 1,9-decadiene, exo- and endo-dicyclopentadiene and the like; exo- and endoalkenylnorbornenes, such as 5-propenyl-, 5- (buten-2-yl)-, and 5-(2-methylbuten-[2']-yl)norbornene and the like; alkylalkenylnorbornenes, such as, 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propyl-norbornadiene and the like; and cyclodienes, such as 1,5-cyclooctadiene and 1,4-cyclooctadiene and the like.

Preferably, the process of this invention is employed to produce a terpolymer of ethylene, propylene and a nonconjugated diene. Most preferably, the nonconjugated diene is 5-ethylidene-2-norbornene, 1,4-hexadiene or dicyclopentadiene when such terpolymers are formed.

The process of this invention may be performed in any suitable reaction medium, which media are well known to those skilled in the art of ethylene copolymerization. Illustrative of such media are aromatic hydrocarbons such as toluene, benzene, xylene and the like; saturated aliphatic hydrocarbons such as pentane, hexane, heptane, cyclohexane and the like; and, in appropriate cases, liquid alphaolefins such as propylene, pentene, hexene and the like; as well as mixtures of two or more of these media.

The process of this invention is preferably performed in the presence of a promoter compound having the formula:

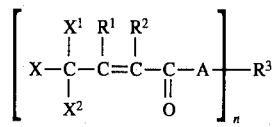

wherein:

n is 1, 2, 3 or 4;

X, $X^1$ and $X^2$ are halogen;

A is oxygen, sulfur or halogen;

$R^1$ is hydrogen, halogen, $C_1$–$C_{16}$ alkyl or —$COOR^4$ wherein $R^4$ is $C_1$–$C_{18}$ alkyl, $C_3$–$C_{18}$ alkenyl, $C_5$–$C_6$ cycloalkyl, $C_7$–$C_9$ aralkyl or $C_6$–$C_{10}$ aryl;

$R^2$ is hydrogen, halogen or $C_1$–$C_{16}$ alkyl;

with the provisos that:

when n is 1 and A is halogen, there is no $R^3$;

when n is 1 and A is oxygen or sulfur, $R^3$ is hydrogen, $C_1$–$C_{18}$ alkyl, $C_6$–$C_{10}$ aryl, $C_7$–$C_9$ alkylaryl, $C_7$–$C_9$ alkylaryl, $C_7$–$C_9$ arylalkyl, $C_3C_6$ alkenyl, $C_1$–$C_{18}$ haloalkyl, $C_6$–$C_{10}$ haloaryl, $C_7$–$C_9$ haloalkylaryl or $C_7$–$C_9$ haloarylalkyl;

when n is 2, A is oxygen or sulfur and $R^3$ is $C_2$–$C_{12}$ alkylene; and when n is 3 or 4, A is oxygen or sulfur, $R^3$ is a $C_n$–$C_{12}$ alkyl radical having the valence n.

Preferably, the promoters employed in the process of this invention are compounds having the above structure wherein:

n is 1 or 2;

X, $X^1$ and $X^2$ are chlorine;

A is oxygen;

$R^1$ is hydrogen, chlorine, $C_1$–$C_8$ alkyl, or $COOR^4$ wherein $R^4$ is $C_1$–$C_8$ alkyl, $C_5$–$C_6$ cycloalkyl, benzyl or phenyl;

$R^2$ is hydrogen, chlorine or $C_1$–$C_8$ alkyl;

with the provisos that:

when n is 1, $R^3$ is $C_1$–$C_{12}$ alkyl, phenyl, tolyl, benzyl, allyl, $C_1$–$C_2$ haloalkyl or halophenyl;

and when n is 2, $R^3$ is $C_2$–$C_6$ alkylene, oxydiethylene or thiodiethylene.

Most preferably, the promoter is selected from the group consisting of butyl 4,4,4-trichlorobut-2-enoate, methyl 2-methyl-4,4,4-trichlorobut-2-enoate, ethyl 4,4,4-trichlorobut-2-enoate, 2-ethylhexyl 4,4,4-trichlorobut-2-enoate and butyl perchlorocrotonate.

Several of these promoters, such as esters and halides of perchlorocrotonic acid, are known compounds and may be readily synthesized by those skilled in the art of organic chemistry.

In general, these other promoters may be prepared by reacting a compound of the formula:

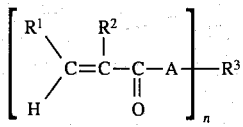

wherein n, A, $R^1$, $R^2$ and $R^3$ are as defined above, with a compound of the formula $C(X)(X^1)(X^2)(X^3)$ wherein X, $X^1$, $X^2$, and $X^3$ are all halogen, in the presence of a catalyst such as $RuCl_2[(C_6H_5)_3P]_3$ to produce a compound of the formula:

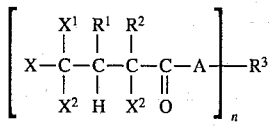

and dehydrohalogenating said compound, e.g., by treatment with an appropriate base. The acid halide promoter compounds may be produced by reacting the appropriate carboxylic acid with a sulfonyl halide on a phosphorous trihalide or pentahalide.

The most preferred promoters are butyl perchlorocrotonate (BPCC) and butyl 4,4,4-trichlorobut-2-enoate (BTCB).

When a promoter compound is employed the catalyst, cocatalyst and promoter are preferably present in the polymerization reaction such that the molar ratio of cocatalyst to catalyst plus promoter is in the range of between about 1.5:1 and about 500:1. More preferably, this molar ratio is in the range of between about 1.5:1 and about 100:1. Most preferably, this molar ratio is in the range of between about 2.5:1 and about 10:1.

The process of this invention is typically performed as follows. The catalyst composition, reaction medium, and comonomers are introduced into the reaction vessel, which is typically composed of a nonreactive material such as glass or stainless steel. In order to obtain best results, it is preferred that alphaolefin (when employed) be anhydrous and thus it is preferable that such monomer be dried, e.g. by passing it through molecular sieves, prior to its introduction into the reactor. Preferably, the water content in the alphaolefin should be no more than ten parts per million by weight.

During such introduction, care should be taken to avoid premixing the promoter with the organoaluminum cocatalyst lest deactivation of the catalyst composition occur.

In a preferred embodiment of the instant invention, hydrogen gas is an added reactant in the polymerization reaction. Hydrogen gas is employed to improve the regulation of the molecular weight of the polymer produced in the reaction. Specifically, lower molecular weights are obtainable when hydrogen gas is utilized. It is emphasized that the use of hydrogen gas as a reactant is not essential.

In general, the catalyst concentration may range between about $1 \times 10^{-8}$ and about $3 \times 10^{-1}$ mole of vanadium per liter of total reaction medium (i.e. reaction medium plus monomer plus catalyst composition). Preferably, between about $1 \times 10^{-7}$ and about $1 \times 10^{31\ 2}$ mole vanadium per liter of total reaction medium is present. Most preferably, between about $1 \times 10^{-6}$ and about $5 \times 10^{-3}$ mole vanadium per liter total reaction medium is employed.

The polymerization reaction of this invention occurs in the liquid state at a temperature in the range of between about $-25620$ C. and about $70620$ C. More preferably, the temperature range of this reaction is between about $-20°$ and about 50° C. Reaction time may vary from several minutes or less to several hours or more depending on factors such as reaction batch size, reaction temperature, the particular reactants selected, and other similar factors. If desired, the reaction may be monitored by sampling or reaction mixture solids measurement.

The reaction product is typically isolated by floccing, decantation or filtering.

The polymer produced by the process of this invention will frequently possess a vanadium concentration which is low enough that washing of the product (in order to reduce the vanadium levels therein so as to avoid degeneration thereof) is typically not necessary. Moreover, the polymer produced by the process of this invention is generally essentially gel free.

By making adjustments well known to those skilled in the art of polymerization, the process of this invention may be operated in a batch or a continuous manner.

EXAMPLES

The following Examples are intended to further illustrate the invention and are not intended to limit the scope of the invention in any manner.

Example 1

Synthesis of Tris-Neopentyl Vanadate

A solution of 4.74 ml (50 mmoles) vanadium oxytrichloride ($VOCl_3$) was dissolved in 50 ml of dried toluene and introduced into a clean dried three-necked round bottom 250 ml flask. The flask was equipped with a reflux condenser, a magnetic stirrer, a dropping funnel, a nitrogen inlet and a gas outlet in communication with a flask filled with a sodium hydroxide solution.

A solution of 13.22 grams (150 millimoles) of neopentyl alcohol in 50 ml of dried toluene was added dropwise into the flask holding the $VOCl_3$ through the dropping funnel. The entire volume of the alcohol solution was dripped into the 250 ml flask in about 20 minutes. Hydrogen chloride gas generated by this reaction flowed upward through the outlet into the sodium hydroxide solution.

Stirring of the contents of the 250 ml flask was continued for 5 hours at ambient temperature under a continual stream of nitrogen gas. At the end of 5 hours hydrogen chloride gas generation had ceased. This cessation of gas generation indicated the completion of the reaction. With this, the nitrogen gas flow, whose purpose was the flushing out of the hydrogen chloride gas, was shut off.

The liquid in the 250 ml flask was subjected to a rotary evaporator whereby the toluene solvent was removed. The remaining liquid, i.e., the product of this reaction, was isolated as a yellowish viscous oil.

The reaction which occurred in this Example is summarized below:

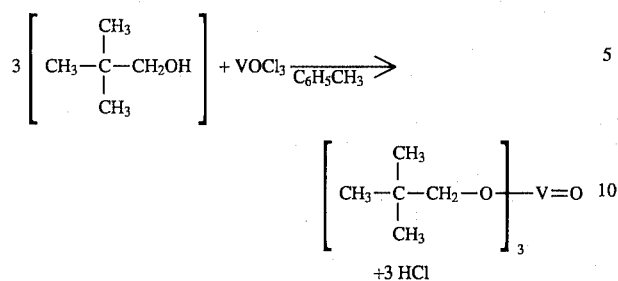

+3 HCl

The IR spectroscopy of tris-neopentyl vanadate did not show any absorption in the frequency range (3200–3650 cm) characteristic of the —OH of neopentyl alcohol. Thus, all the neopentyl alcohol reacted completely with VOCl₃ and resulted in the formation of tris-neopentyl vanadate. Absorption at about 1450 cm for the alpha group (—CH₂—) confirmed the presence of the neopentyl group in the vanadate. Isolation of the corresponding amount of NaCl from the NaOH solution (through which the HCl generated was passed) further confirmed the formation of tris-neopentyl vanadate.

Example 2

Synthesis of Dichloroneopentyl Vanadate

Using the same experimental procedure and equipment as employed in Example 1, 9.48 ml. of vanadium oxytrichloride (100 millimoles) was dissolved in 50 milliliters of toluene. To this solution was added, dropwise, 8.82 grams (100 millimoles) of neopentyl alcohol solution dissolved in 50 milliliters of toluene.

After reaction and purification, a yellowish viscous oil was obtained in 90% yield.

The IR spectroscopy of dichloroneopentyl vanadate did not show any absorption in the frequency range (3200–3650 cm¹) characteristic of the —OH of neopentyl alcohol. Thus, all the neopentyl alcohol reacted completely with VOCl₃ and resulted in the formation of dichloroneopentyl vanadate. Absorption at about 1450 cm for the alpha group (—CH₂) confirmed the presence of the neopentyl group in the vanadate. Isolation of the corresponding amount of NaCl from the NaOH solution (through which the HCl generated was passed) further confirmed the formation of dichloroneopentyl vanadate.

Examples 3–8

Synthesis of Additional Vanadates

Following the procedure of Example 1, species having the generic formula:

$(O)_n V(OCH_2R)_p(OR^1)_q X_m$ are produced. The compounds produced are tabulated in Table 1.

TABLE 1

| EXAMPLE NO. | R | R¹ | n | m | p | q |
|---|---|---|---|---|---|---|
| 3 | t-C₄H₉ | C₄H₉ | 1 | 0 | 2 | 1 |
| 4 | t-C₄H₉ | i-C₃H₇ | 1 | 1 | 1 | 1 |
| 5 | t-C₁₈H₃₇ | CH₃ | 1 | 0 | 2 | 1 |
| 6 | t-C₆H₁₃ | —CH₂C(CH₃)₂CH₂— | 1 | 0 | 1 | 2 |
| 7 | t-C₁₈H₃₇ | —(CH₂)₄— | 1 | 0 | 1 | 2 |
| 8 | t-C₁₂H₂₅ | — | 1 | 0 | 3 | 0 |

Examples 9–11

Synthesis of Additional Vanadates

Example 1 is repeated with the exception that the VOCl₃ reactant is replaced with VCl₄. The reaction includes the presence of an acid acceptor such as NH₃. Table 2 summarizes compounds of the formula $(O)_n V(OCH_2R)_p(OR^1)_q X_m$ that are produced.

TABLE 1

| EXAMPLE NO. | R | R¹ | n | m | p | q |
|---|---|---|---|---|---|---|
| 9 | t-C₁₂H₂₅ | C₁₂H₂₅ | 0 | 0 | 2 | 2 |
| 10 | t-C₄H₉ | C₁₂H₃₇ | 0 | 1 | 1 | 2 |
| 11 | t-C₄H₉ | — | 0 | 0 | 0 | 0 |

Example 12

Synthesis of EPDM Polymer Utilizing Bis-neopentyl Chlorovanadate as a Catalyst N-heptane was introduced into a cleaned and dried three-necked round bottom flask. The flask was equipped with an overhead mechanical stirrer, a thermometer, a condensor, a gas inlet tube and a 1000 ml dropping funnel through which the n-heptane (1000 ml, dried over alumina) was placed into the flask.

Ethylene and propylene gases were simultaneously added to the n-heptane filled flask through the gas inlet tube. Both olefin gases were free of air and had been previously dried by passing though columns of 3A and 13X molecular sieves. This gas introduction step continued until both olefins were saturated in the n-heptane solvent (approximately 5 minutes). Saturation was signalled by plateauing of increasing temperature of the heptane solution.

To the saturated solution of n-heptane, ethylaluminum sesquichloride (EASC), a cocatalyst, was added by charging the EASC in an n-heptane solution (1.35 ml of 0.74M, about 1 millimole) into the flask through the dropping funnel.

Polymerization was initiated immediately thereafter by the dropwise addition of a catalyst solution comprising bis-neopentyl chlorovanadate (BNCV) (0.0125 millimole), butyl 4,4,4-trichlorobut-2-enoate (BTCB), a catalyst activator (0.6 millimole) and 5-ethylidene-2-norbo..nene (ENB), a nonconjugated diene (2 ml, about 10 millimoles) all in dried n-heptane (60 ml) through the dropping funnel.

The run continued for approximately 50 minutes. During this time the catalyst solution was continuously introduced dropwise into the flask through the dropping funnel. Additionally, ethylene and propylene gases were continuously fed into the flask through the gas inlet tube. It is noted that both gases were free of air and dried in the manner described above.

During the polymerization, the temperature of the solution increased slowly until a maximum was reached followed by a similar slow retreat in temperature. Sixty minutes after the polymerization reaction began (10 minutes after the complete addition of the catalyst, activator solution) the reaction was terminated by the addition of isopropanol (5 ml).

Thereafter, the polymer in solution was precipitated with isopropanol to which about 0.5 weight percent of an antioxidant, comprising a trialkylaryl phosphite and styrenated para-cresol, was added. The stabilized polymer was recovered, weighted and analyzed.

The polymer was analyzed as EPDM characterized by an ethylene to propylene weight ratio of 76:24, an intrinsic viscosity of 2.53 (as measured in tetralin at 135° C.), an iodine number of 6.8 and a glass transition temperature of −41° C. The yield of EPDM polymer was 53.4 grams. From this, and a knowledge of the weight of the BNCV catalyst introduced into the reaction, the catalyst efficiency and vanadium residue were calculated. The catalyst efficiency, i.e. the weight of polymer produced per millimole of BNCV, was 4,352 and the vanadium residue in parts per million parts of polymer was 11.9.

These results are also tabulated in Table 3 below.

Example 13

Synthesis of EPDM Polymer Utilizing Tris-neopentyl Vanadate as a Catalyst

A polymerization reaction was carried out in exactly the same manner as has been described in Example 12, including the quantities of ingredients used in that example, but for the substitution of 0.0125 millimole of tris-neopentyl vanadate (TNPV) for the 0.0125 millimole of BNCV of Example 12. Similarly successful results were obtained including a catalyst efficiency of 3040 grams of polymer per millimole of TNPV. The full results of this Example are summarized in Table 3.

Examples 14–16

Synthesis of EPDM Polymer Utilizing Bis-neopeptyl Chlorovanadate

Three additional experiments were run in exact accordance with Example 12 with the exception that the BTCB catalyst activator of Example 12 was replaced with an equimolar amount of different activators: methyl 4,4,4-trichloro-2-methylbut-2-enoate (MTMB) in Example 14; butyl perchlorocrotanate (BPCC) in Example 15; and ethyl 4,4,4-trichloro-2-enoate (ETCB) in Example 16. All three runs were successful and are summarized in Table 3.

Comparative Example A

Example 12 was repeated exactly but for the substitution of catalyst of the prior art, vanadium oxytrichloride ($VOCl_3$) for the BNCV of Example 12. The resultant EPDM product had properties summarized in Table 3.

Comparative Example B

Example 15 was repeated but for the substitution of the commonly employed catalyst of the prior art, vanadium oxytrichloride, for the catalyst, BNCV, of the current invention. The resultant EPDM product was produced in the amount tabulated in Table 3.

TABLE 3

| EXAMPLE NO. | 12 | 13 | 14 | 15 | 16 | Comp A | Comp B |
|---|---|---|---|---|---|---|---|
| Catalyst | BNCV | TNPV | BNCV | BNCV | BNCV | $VOCl_3$ | $VOCl_3$ |
| Catalyst Activator | BTCB | BTCB | MTMB | BPCC | ETCB | BTCB | BPCC |
| Molar Ratio (Cat Act/Cat) | 48:1 | 48:1 | 48:1 | 48:1 | 48:1 | 48:1 | 48:1 |
| Yield (g of Polymer) | 54.4 | 38 | 51 | 37.2 | 49 | 23 | 24 |
| Catalyst Eff * (g Polymer/mmol V) | 4352 | 3040 | 4080 | 2976 | 3920 | 1840 | 1920 |
| Vanadium Residue ** (parts V per million parts Polymer) | 11.9 | 16.7 | 12.5 | 17 | 13 | 27.7 | 26.5 |
| Ethylene/Propylene Wt Ratio | 76/24 | 69/31 | 74/26 | 71/29 | 70/30 | 72/28 | 71/29 |
| Intrinsic Viscosity (in tetralin at 135° C.) | 2.53 | 2.30 | 2.37 | 2.06 | 2.11 | 3.13 | 2.64 |
| Iodine Number | 6.8 | 9.5 | 9.5 | 8.0 | 8.0 | 16.3 | 10.6 |
| Glass Transition Temp. (°C.) | −41 | −45 | −46 | −51 | −45 | −38 | −45 |

\* Calculation based upon weight of polymer produced.
\*\* Calculation based upon assumption that all vanadium is in product polymer.

DISCUSSION

The Comparative Examples establish the unexpectedly improved catalyst efficiency obtained employing the catalysts of this invention. When all other factors were the same, the use of BNCV of this invention (Example 12) resulted in a catalyst efficiency of 4,352 grams of EPDM per millimole of vanadium compared to an efficiency of 1,840 grams of EPDM per millimole of vanadium when the preferably employed catalyst of the prior art, vanadium oxytrichloride was employed (Comparative Example A). This, in turn, resulted in a catalyst residue, calculated as parts of vanadium per million parts of EPDM polymer, of 11.9 in the case where BNCV was the catalyst compared to a catalyst residue of 27.7 ppm when $VOCl_3$ was similarly employed.

Similar unexpected results are observed in the comparison between Example 15 of the current invention and Comparative Example B of the prior art. In Example 15, using BNCV, a catalyst of the instant invention, a catalyst efficiency of 2,976 was obtained compared to an efficiency of 1,920 when $VOCl_3$, a catalyst of the prior art, was used. A similar improved result is noted in the catalyst residue. In Comparative Example B a calculated residue of 26.5 parts of vanadium per million parts of polymer is present while the polymer made in accordance with the present invention possesses a decreased residue of 17 parts of vanadium per million parts of polymer.

In addition to the quantitative improvements summarized above, the EPDM polymer produced in accordance with instant invention as compared to those obtained using a catalyst of the prior art is of a higher quality as well. As those skilled in the art are aware, molecular weight regulation of elastomeric polymers is important in processing of rubbers. Those with shorter chains provide such easier processing. In the above two comparisons, the use of the catalysts of this invention result in lower intrinsic viscosities, an indicia of polymer chain length.

Example 17

Synthesis of EPDM Polymer Utilizing Bis-neopentyl Chlorovanadate as a Catalyst Polymerization grade propylene gas (500 grams) was condensed in a 2-liter Parr autoclave by cooling the autoclave externally with dry ice. The Parr autoclave was equipped with a pressure gauge, an inlet tube, an outlet port, a safety disc and a stirrer assembly. Prior to the introduction of the propylene, the autoclave had been cleaned, dried and purged with nitrogen.

The Parr autoclave, filled with propylene, was warmed to −19° C. Hydrogen gas was introduced into the autoclave by supplying it to the autoclave at a pressure of 20 psig which represented 20 pounds per square inch in excess of the pressure in the autoclave (overpressure). Similarly, ethylene gas was introduced at 20 pounds per square inch overpressure. 1.48 millimoles of ethyl aluminum sesquichloride (EASC) was added through the outlet port.

A solution including 0.025 millimole of bisneopentyl chlorovanadate (BNCV), 5.4 grams of 5-ethylidene-2-norbornene (ENB) and 0.4 millimole of butyl 4,4,4-trichlorobut-2-enoate (BTCB) was added to initiate the reaction.

The autoclave was stirred at moderately high speed and, at the same time, cooled by a −27° C. bath which comprised dry ice in isopropanol to prevent heat buildup in the autoclave.

Ethylene was continuously fed into the autoclave. Over the remainder of the 45 minute run the remainder of the BNCV catalyst and BTCB catalyst activator were added to the reaction. It is noted that the initial charge of the BNCV and BTCB represented 20% by weight of the total catalyst and catalyst activator provided during the run.

In spite of the heat transfer arrangement, the temperature in the autoclave rose from −20° C. to 7° C. after 1 hour. At this point, the reaction was short stopped by adding isopropanol to the autoclave.

The polymer product of this reaction dispersed in the reaction mass was recovered by filtration. The yield was 110.3 grams representing 16.8% solids based on the total weight of the slurry. This represented a calculated catalyst efficiency of 4,412 grams of polymer per millimole of vanadium catalyst. Assuming no recovery of catalyst residue, this represents a concentration of approximately 11.7 parts per million of vanadium in the polymer product.

The polymer product was analyzed and found to have the properties summarized in Table 4 below. Table 4 also includes a summary of the operating conditions of this example.

Example 18

Example 17 was repeated except that the amount of the catalyst BCNV was reduced to 0.125 millimole. A summary of this example including its results are provided in Table 4.

Example 19

Example 18 was repeated except that the total duration of the run was decreased by one-third from 1 hour to 40 minutes. This example is also summarized in Table 4.

TABLE 4

| EXAMPLE NO. | 17 | 18 | 19 |
|---|---|---|---|
| Propylene, grams | 500 | 500 | 492 |
| Ethylene, grams | 85.7 | 85.2 | 75.9 |
| ENB, grams | 5.4 | 5.4 | 5.4 |
| Catalyst, BNCV, mmol | 0.025 | 0.0125 | 0.0125 |
| Cat. Activator, BTCB, mmol | 0.4 | 0.4 | 0.4 |
| Hygrogen, psig | 20 | 20 | 20 |
| Reaction Time, min | 60 | 60 | 40 |
| Yield, gm of Polymer | 110.3 | 91.6 | 81.0 |
| Efficiency, gm of Polymer per mmol of V Catalyst | 4412 | 7328 | 6480 |
| Solids, % by Wt of Polymer in Propylene | 16.8 | 13.9 | 12.6 |
| Vanadium in Polymer, ppm | 11.7 | 6.9 | 7.9 |
| Intrinsic Viscosity of Polymer (in tetralin at 135° C.) | 3.59 | 1.86 | 3.18 |
| Iodine Number | 5.9 | 6.5 | 7.0 |
| Ethylene/Propylene Wt Ratio | 59/41 | 62/38 | 63/37 |
| Glass Transition Temp (°C.) | −54 | −56 | −54 |

The above data indicate the effectiveness of bis-neopentyl chlorovanadate as a catalyst for EPDM production.

The foregoing embodiments and Examples will make apparent to those skilled in the art other embodiments and Examples. Such other embodiments and Examples, within the scope and spirit of the instant invention, are within the contemplation of this invention. Therefore, the scope of the instant invention should be limited only by the appended claims.

What is claimed is:

1. A compound of the formula

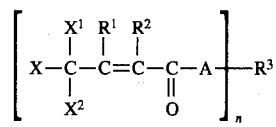

wherein:

n is 1;

X, $X^1$ and $X^2$ are chlorine or bromine;

A is oxygen or sulfur;

$R^1$ is hydrogen or $C_1$–$C_6$ alkyl;

$R^2$ is hydrogen or $C_1$–$C_6$ alkyl; and $R^3$ is hydrogen or $C_2$–$C_{12}$ alkyl, with the proviso that when $R^1$ and $R^2$ are both hydrogen and X, $X^1$ and $X^2$ are all chlorine, then $R^3$ is 2-ethylhexyl.

2. A compound according to claim 1 wherein:

n is 1;

X, $X^1$ and $X^2$ are chlorine;

$R^1$ is hydrogen;

$R^2$ is methyl;

A is oxygen; and $R^3$ is butyl.

3. A compound according to claim 1 wherein $R^3$ is 2-ethylhexyl.

4. A compound of the formula

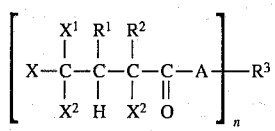

wherein:

n is 1;

X, $X^1$ and $X^2$ are each, independently, chlorine or bromine;

A is oxygen or sulfur;

$R^1$ is hydrogen or $C_1$–$C_6$ alkyl;

$R^2$ is hydrogen or $C_1$–$C_6$ alkyl; and $R^3$ is $C_3$–$C_6$ alkyl.

5. A compound according to claim 4 wherein:

n is 1;

X, $X^1$ and $X^2$ are chlorine;

$R^1$ is hydrogen;

$R^2$ is methyl;

A is oxygen; and $R^3$ is butyl.

6. A compound according to claim 1 wherein X is chlorine.

7. A compound according to claim 6 wherein $X^1$ and $X^2$ are chlorine.

8. A compound according to claim 4 wherein X is chlorine.

9. A compound according to claim 7 wherein $X^1$ and $X^2$ are chlorine.

10. A compound as recited in claim 4 wherein $R^3$ is $C_3$–$C_4$ alkyl.

11. A compound of the formula

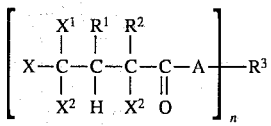

wherein:

n is 1;

X, $X^1$ and $X^2$ are each, independently, chlorine or bromine;

A is oxygen or sulfur;

$R^1$ is hydrogen or $C_1$–$C_6$ alkyl;

$R^2$ is $C_1$–$C_6$ alkyl; and $R^3$ is $C_3$–$C_{12}$ alkyl.

* * * * *